Patented Dec. 27, 1938

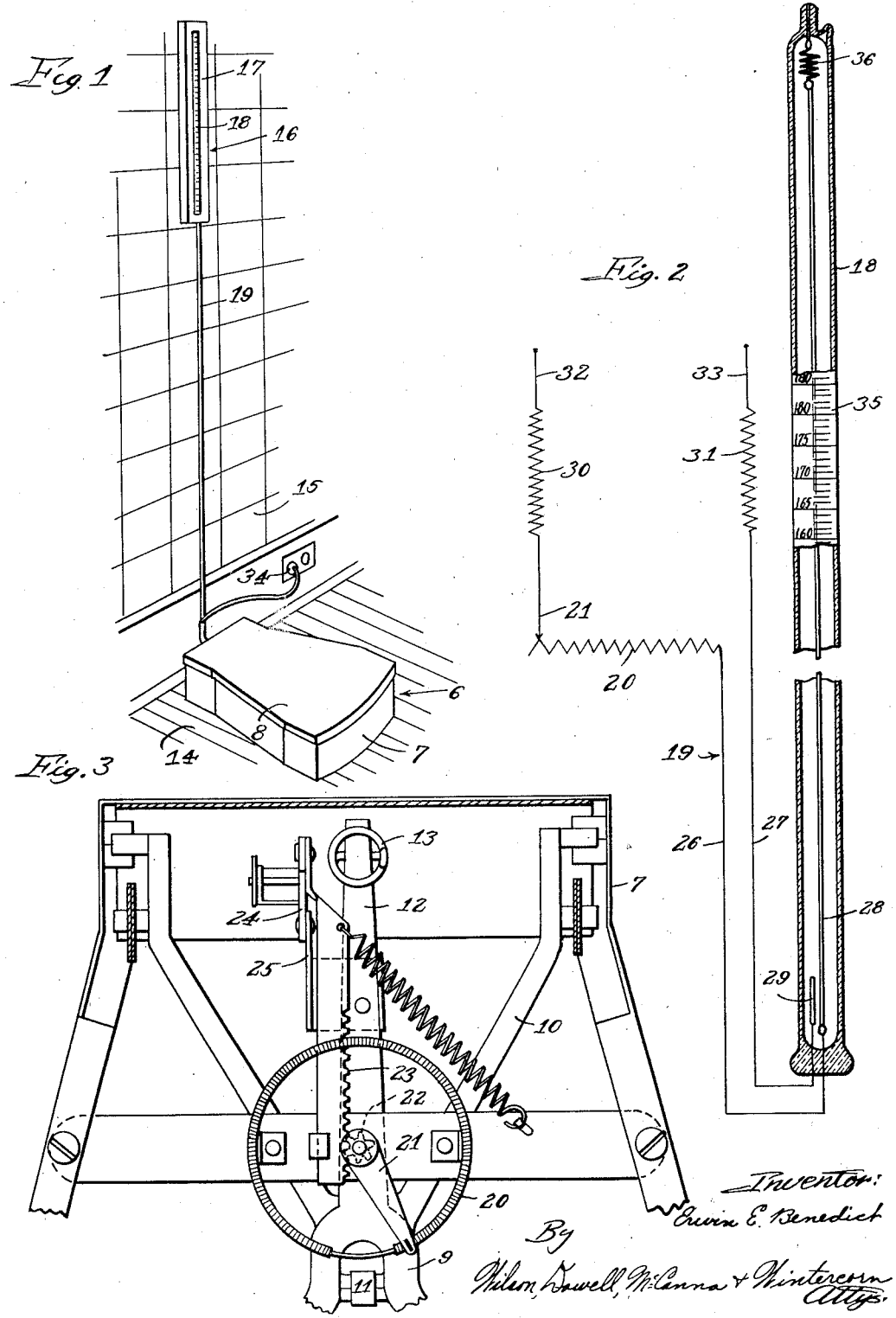

2,141,236

UNITED STATES PATENT OFFICE 2,141,236

BATHROOM SCALE

Erwin E. Benedict, Rockford, Ill., assignor to The Brearley Company, Rockford, Ill., a corporation of Illinois Application May 13, 1935, Serial No. 21,167

1 Claim. (Cl. 177—351)

This invention relates to scales for weighing persons, and is particularly concerned with that type known as bathroom scales.

The principal object of my invention is to provide an electrical scale having a separate weight indicator arranged to be mounted on the wall and electrically connected with the scale proper by a flexible extension cord, thereby permitting the placing of the indicator at any desired elevation for easier reading.

A salient feature of the scale of my invention lies in the use of a weight indicator that is arranged to be read like a thermometer, the same comprising a specially constructed neon tube with a longitudinal filament that becomes illuminated throughout a different length for each weight to accordingly give a clearly visible indication on a graduated scale provided on or adjacent the tube. In accordance with my invention, a transmitter in an electrical scale is electrically connected with the spaced filaments of the tube and resistance is cut out of the circuit in proportion to the weight imposed upon the scale, whereby to cause the illumination to travel along the longitudinal filament a proportionate distance, as ionization to a proportionate degree takes place in the tube.

The invention is illustrated in the accompanying drawing, in which—

Figure 1 is a perspective of a bathroom scale and associated wall indicator made in accordance with my invention;

Fig. 2 is an electrical circuit diagram therefor showing the neon tube partly in elevation and partly in longitudinal section, and Fig. 3 is a fragmentary sectional view of the scale showing the rheostat embodied therein and arranged to be electrically connected with the tube as in Fig. 2.

The same reference numerals are applied to corresponding parts throughout the views.

Referring to Figs. 1 and 3, the scale 6 may be any domestic type platform scale and comprises a base 7 and platform 8. The latter is supported on wishbone levers 9 and 10 fulcrumed on the base in the usual way. The levers are interconnected centrally, as at 11, and the lever 9 has an extension 12 attached to the lower end of a coiled tension spring 13 arranged to be supported in any suitable way on the base 7. The spring resists the movement of the levers in the usual way to counterbalance the weight imposed upon the platform 8. The scale is shown resting on the floor 14 next to a wall 15 on which the weight-indicating device 16 is mounted. The latter has its base 17 preferably placed at such an elevation that the readings on the tube 18 will be approximately at eye level, so as to make it easier to read an indicated weight. The device 16 is supported entirely independently of the scale 6 and is connected with the scale only through a flexible extension cord 19 through which the scale and indicator are electrically connected, as hereinafter described. One can, therefore, place the indicator at whatever level is desired to best suit the convenience of the operator, and, of course, the indicator may be placed on one wall with the scale facing another wall at right angles thereto, if the available space in the bathroom is such that it requires that arrangement.

The scale 6 has, instead of the usual weight-indicating dial in which either a dial or a pointer is turned in proportion to the weight imposed upon the platform 8, a transmitter comprising a rheostat 20 relative to which an arm 21 is arranged to be turned to adjust the rheostat in proportion to the weight imposed upon the platform. The arm 21 is turned with a pinion 22 meshing with a rack 23 that is operated by the oscillation of a bell crank lever 24 suitably connected, as at 25, to the extension 12 of the lever 9. The rheostat 20 and its movable arm 21 are shown in Fig. 2 as part of a circuit diagram with conductors 26 and 27 in the extension cord 19 connected to the long and short filaments or electrodes 28 and 29, respectively, of the gas filled neon tube 18. Two fixed high resistances 30 and 31 are connected in series with line conductors 32 and 33. These serve to cut down the current flow sufficiently to eliminate danger of electrical shock in the operation of the scale so that one may with entire safety connect the device to an ordinary light socket as by means of an attachment plug 34 (Fig. 1). The filaments or electrodes 28 and 29 may be of nickel coated with barium oxide or some other alkaline earth oxide such as strontium oxide, or a mixture of strontium and barium oxide, or any other low work function chemical capable of the well known ionization as produced in neon tubes.

In operation, when there is no weight on the scale platform 8, the filaments 28 and 29 will show no illumination, there being insufficient current flow through all of the resistances in series with these filaments to produce ionization. However, when a person stands upon the platform, the arm 21 will be turned through an angularity proportionate to his weight, and a certain resistance will accordingly be cut out of the circuit in the rheostat 20, thus building up the current flow which will be immediately reflected in the travel of illumination up the filament 28 to a certain point, depending upon the weight of the person. The person can then read his weight directly by reference to the scale 35 which is graduated and marked as shown. A sharp line of demarcation is presented at the end of the illuminated portion of the filament, so that accurate reading is possible. If desired, the graduated weight scale 35 may be provided on the base 17 adjacent the tube. The filament 28 can be kept properly tensioned by means of a coiled spring 36 attached to its upper end, as shown.

If a zero adjustment is required, this may be provided by a manually adjustable resistance connected in series in the circuit. Then, if the illumination on the filament 28 appears above or below the zero mark when there is no weight on the scale, it is only necessary to adjust this resistance to bring the illumination down or up, as the case may be, enough to give a zero reading.

While I have shown a rheostat 20 having a traveling brush, it should be understood that any other suitable or preferred form of rheostat may be employed. For example, a graphite-mica or carbon pile rheostat could be employed to advantage and thereby enable elimination of the spring 13, as well as permitting further simplification of the scale structure. As disclosed in a copending application, Serial No. 21,168, filed May 13, 1935, I propose to eliminate the wishbone levers and to support the platform directly upon the compression type carbon rheostats.

Furthermore, while I have shown a circuit with means for varying the current flow by variation of resistance, it should be understood that the invention is not limited thereto inasmuch as the current flow may be affected by voltage regulation, leaving the resistance unchanged. In other words, the weight applied would result in voltage regulation instead of a change in resistance. The appended claim has accordingly been drawn with a view to covering these and other legitimate modifications and adaptations of the present invention.

I claim:

A wall type weight indicator for a domestic weighing device of the type described comprising a platform scale adapted to rest on the floor of a room in proximity to the wall thereof, a transmitter including an impedance, means to vary said impedance dependent upon the weight of the person being weighed, and means for flexibly electrically connecting said transmitter and said wall type weight indicator, said indicator comprising a substantially straight elongated neon tube adapted to be adjustably and detachably attached to the wall of the room at the approximate eye level of the person being weighed, said tube having spaced electrodes therein, one of which extends longitudinally of the tube and is visible from the outside thereof when illuminated, said electrodes adapted to be connected to said last named electrical connecting means, and a graduated weight indication scale extending lengthwise relative to the longitudinal filament.

ERWIN E. BENEDICT.